(12) United States Patent
Singh et al.

(10) Patent No.: US 12,573,112 B1
(45) Date of Patent: Mar. 10, 2026

(54) VISUAL PROMPTING METHODS FOR GPT-4V BASED ZERO-SHOT GRAPHIC LAYOUT DESIGN GENERATION

(71) Applicant: Fractal Analytics Limited, Mumbai (IN)

(72) Inventors: Kunal Singh, Mumbai (IN); Mukund Khanna, Mumbai (IN); Ankan Biswas, Mumbai (IN); Pradeep Moturi, Mumbai (IN); Shivam, Mumbai (IN)

(73) Assignee: Fractal Analytics Limited, Mumbai (IN)

( * ) Notice: Subject to any disclaimer, the term of this patent is extended or adjusted under 35 U.S.C. 154(b) by 0 days.

(21) Appl. No.: 19/205,398

(22) Filed: May 12, 2025

(30) Foreign Application Priority Data

Feb. 15, 2025 (IN) .............................. 202521013043

(51) Int. Cl.
| | |
|---|---|
| *G06T 11/60* | (2006.01) |
| *G06N 3/04* | (2023.01) |
| *G06N 5/04* | (2023.01) |
| *G06N 20/00* | (2019.01) |
| *G06T 7/11* | (2017.01) |
| *G06T 11/00* | (2006.01) |
| *G06T 11/20* | (2006.01) |
| *G06V 10/77* | (2022.01) |
| *G06V 10/82* | (2022.01) |

(52) U.S. Cl.
CPC .............. *G06T 11/60* (2013.01); *G06T 7/11* (2017.01); *G06T 11/001* (2013.01); *G06T 11/203* (2013.01); *G06T 2207/20084* (2013.01); *G06T 2207/20152* (2013.01); *G06T 2207/30204* (2013.01); *G06T 2210/12* (2013.01)

(58) Field of Classification Search
CPC ...... G06T 11/001; G06T 11/203; G06T 11/60; G06T 7/11; G06T 2207/20084; G06T 2207/20152; G06T 2207/30204; G06T 2210/12; G06F 40/295; G06F 40/126; G06F 18/211; G06F 18/29; G06F 16/3329; G06F 16/2237; G06F 40/30; G06F 40/279; G06F 40/35; G06F 11/3075; G06V 10/774; G06V 10/776; G06V 10/82; G06V 20/41; G06V 20/44; G06N 3/045; G06N 3/044; G06N 3/08; G06N 5/042; G06N 20/00; G06N 3/04; G06N 3/006; G06N 5/02; G06N 5/025; G10L 13/08; G10L 13/187
See application file for complete search history.

(56) References Cited

U.S. PATENT DOCUMENTS

| | | | | |
|---|---|---|---|---|
| 12,165,073 | B2 * | 12/2024 | Minsky ............... | G06F 16/3329 |
| 2024/0169623 | A1 * | 5/2024 | Zeng ........................ | G06T 11/60 |
| 2024/0354491 | A1 * | 10/2024 | Bouguerra .............. | G06F 40/20 |
| 2024/0354711 | A1 * | 10/2024 | Bouguerra ............ | G06F 16/345 |

(Continued)

*Primary Examiner* — Wesner Sajous
(74) *Attorney, Agent, or Firm* — Wiley Rein LLP

(57) ABSTRACT

GPT-4-Vision (GPT-4V) large multimodal models (LMMs) may be used to do zero-shot graphic layout design generation in a versatile manner. Segmentation/superpixel methods may be used to identify and mark the key regions to visually augment the image to enhance GPT-4V's spatial reasoning capability. The results demonstrate the efficacy of these visual prompting methods, showing improvement over standard GPT-4V prompting methods and also performing at par and even better, for some techniques, when compared to the LayoutDetr model.

20 Claims, 4 Drawing Sheets

Input Image  102  103  104  GPT-4V  Output Image

101

(56)         References Cited

U.S. PATENT DOCUMENTS

2024/0355020 A1 * 10/2024 Kumar .................... G06T 11/60
2024/0362036 A1 * 10/2024 Jacob .................... G06F 3/0481
2025/0036973 A1 *  1/2025 Minsky .................... G06N 3/08

* cited by examiner

VISUAL PROMPTING METHODS FOR GPT-4V BASED ZERO-SHOT GRAPHIC LAYOUT DESIGN GENERATION

FIELD OF THE DISCLOSURE

The present disclosure generally relates to visual prompting, and more particularly, to visual prompting methods for GPT-4V based zero-shot graphic layout design generation.

BACKGROUND

Graphic layout design generation can be a problem in computer vision. The key aspect of the challenge is ensuring coherent placement of textual elements on the background image to ensure aesthetic appeal and avoiding occlusion of key visual elements. Although prior methods have made attempts to solve this multi-modal problem, those methods could not perfect it.

Graphic layout design involves the strategic arrangement of textual and visual elements to convey a message and is a crucial aspect of visual communication and marketing. This process requires a thoughtful understanding of the structure of each element and its relationship among the elements. Automating this task has immense real-world applications and remains a critical problem in vision. Efforts have been made using generative models, but they do not account for the text content and do unconditional generation. Researchers have also tried by formulating this as an object detection task where they predict a bounding box for an input text string on an input image by using text-guided object detection conditioned on multi-modal inputs. but it still struggles with inaccurate placements leading to lower aesthetic performance and occlusion issues.

Large multimodal language models (LMMs) or large vision language models (VLM) have shown great promise for general visual intelligence. However, they struggle to do visual grounding and cannot precisely do spatial reasoning. For example, if we share an image of dog and a cat in an image and ask Generative Pre-trained Transformer 4 Vision (GPT-4V) to answer which part (left/right/down) of the image do the animals belong to, it will answer mostly correctly. But if GPT-4V is asked to give the coordinates of the center of the animals, it struggles to give the precise coordinates, that is, it struggles to ground the location. While VLMs may be considered to have state-of-the-art visual understanding skills, graphic design generation is an advanced task for even the state-of-the-art VLMs such as GPT4V.

SUMMARY

Graphic layout design involves the strategic arrangement of textual and visual elements to convey a message and is a crucial aspect of visual communication and marketing. Graphic layout design requires a thoughtful understanding of the structure of each element and its relationship among the elements. Embodiments of the present disclosure may utilize Set-of-Marks (SOM) with a segmentation algorithm, wherein markers/labels may be placed at the center of the objects. Accordingly, the models according to embodiments of the present disclosure may improve on visual grounding with respect to baseline even if a problem with grounding the location may remain.

A plurality of segmentation strategies according to embodiments of the present disclosure may be used to divide an image into a plurality of regions. Segmenting just objects and putting labels on them is not effective for advanced visual reasoning tasks like graphic layout generation. Accordingly, segmentation strategies according to embodiments of the present disclosure may be used to divide image into regions, for example, by pixel color similarity or even just by dividing into grids.

GPT-4V may predict the placement of primary text on the graphics. To that end, different segmentation strategies may be used to create regions on the images and put markers on the regions. The image may be passed to GPT-4V, and the prompt may be shared. GPT-4V may provide the bounding box for the text placement. For the final image, the bounding box location may be used to put the primary text on the image.

Unlike the supervised approaches, embodiments of the present disclosure may use a generalist LMM to do zero-shot layout designing due to their ability to reason and analyze diverse modalities simultaneously. Generative Pre-trained Transformer 4 Vision (GPT-4V) may be used across various vision tasks including, but not limited to, medical image visual question answering (VQA), object detection, segmentation, anomaly detection, and/or autonomous driving leveraging its powerful generation capabilities. Embodiments of the present disclosure may improve the visual understanding of GPT-4V by using segmentation algorithms to mark different sub-regions for grounding tasks. Understanding the accurate placement and alignment of the foreground textual content on the background image requires global and local comprehension of the overall image and sub-sections of the image respectively. Embodiments of the present disclosure may use GPT-4V to do zero-shot layout generation for text element and explore various visual prompting methods to improve the generation quality by improving the understanding of GPT-4V of the image. Grid and super-pixel clustering-based labelling methods may be used as they show better performance than previously known visual prompting methods. This visual prompting approach according to embodiments of the present disclosure may help GPT-4V have improved performance.

Embodiments of the present disclosure may provide a method for zero-shot graphic layout design generation using GPT-4-Vision (GPT-4V) large multimodal models (LMMs), the method comprising: using one or more segmentation strategies, dividing at least one image into a plurality of regions; using the one or more segmentation strategies, placing at least one marker on the plurality of regions; passing the at least one image that has been divided and marked to Generative Pre-trained Transformer 4 Vision (GPT-4V), wherein a prompt is shared; and using GPT-4V, providing a bounding box to predict placement of primary text on the image, wherein the bounding box is applied to a final image to place primary text on the final image. The one or more segmentation strategies may be selected from pixel color similarity, dividing into grids, SLIC, and watershed. The one or more segmentation strategies may visually augment the image to enhance spatial reasoning capability of GPT-4V. The at least one image may include a plurality of text elements. The prompt may provide bounding box coordinates for a position identified as best for placement of text within the at least one image based on positioning of other elements present in the at least one image. The prompt also may provide an ideal font size of the text and choose an appropriate font color to maintain readability when placed on a background of the at least one image. The prompt may include at least the following: identification of dimensions of the at least one image; identification of a purpose associated with the at least one image; a request to suggest where within the at least one image to place the primary text by providing coordinates for the bounding box for the primary text; a directive as to position selection; a directive as to font size selection; and a directive as to font color selection. Providing coordinates for the bounding box for the primary text may further comprise calculating an area that the primary text is to occupy; and providing the coordinates, wherein the primary text does not go outside of the at least one image and the coordinates are specified according to a width needed for placement. The directive as to position selection may identify that the primary text is to be positioned in a plain area not overlapping other objects present in the at least one image. The directive as to font size selection may identify that the primary text has at least a font size that does not overlap any objects in the at least one image. The directive as to font color selection may identify that the font color is black or white contrasting with a background of the at least one image. The method also may include outputting the bounding box in a format comprising: Line1: 'Font Size=p' where p is the font size suggestion. Line2: 'Coordinates=[x1,y1] where x1, y1 are top left coordinates of the bounding box. Line3: 'Font Color=k' where k=0,0,0 if font color is black and k=256,256,256 if font color is white. Line4: 'Bottom=[p1,q1]' where p1, q1 are bottom right coordinates of the bounding box.

Other embodiments of the present disclosure may provide a method for zero-shot graphic layout design generation using GPT-4-Vision (GPT-4V) large multimodal models (LMMs), the method comprising: using one or more segmentation strategies, dividing at least one image into a plurality of regions, the at least one image including a plurality of text elements; using the one or more segmentation strategies, placing at least one marker on the plurality of regions; passing the at least one image that has been divided and marked to Generative Pre-trained Transformer 4 Vision (GPT-4V), wherein a prompt is shared, the prompt providing bounding box coordinates for a position identified as best for placement of text within the at least one image based on positioning of other elements present in the at least one image; and using GPT-4V, providing a bounding box to predict placement of primary text on the image, wherein the bounding box is applied to a final image to place primary text on the final image. The prompt also may provide an ideal font size of the text and choose an appropriate font color to maintain readability when placed on a background of the at least one image. The prompt may include at least the following: identification of dimensions of the at least one image; identification of a purpose associated with the at least one image; a request to suggest where within the at least one image to place the primary text by providing coordinates for the bounding box for the primary text; a directive as to position selection; a directive as to font size selection; and a directive as to font color selection. Providing coordinates for the bounding box for the primary text may further comprise calculating an area that the primary text is to occupy; and providing the coordinates, wherein the primary text does not go outside of the at least one image and the coordinates are specified according to a width needed for placement. The directive as to position selection may identify that the primary text is to be positioned in a plain area not overlapping other objects present in the at least one image. The directive as to font size selection may identify that the primary text has at least a font size that does not overlap any objects in the at least one image. The directive as to font color selection may identify that the font color is black or white contrasting with a background of the at least one image. The method also may include outputting the bounding box in a format comprising: Line1: 'Font Size=p' where p is the font size suggestion. Line2: 'Coordinates=[x1,y1] where x1, y1 are top left coordinates of the bounding box. Line3: 'Font Color=k' where k=0,0,0 if font color is black and k=256,256,256 if font color is white. Line4: 'Bottom=[p1,q1]' where p1, q1 are bottom right coordinates of the bounding box.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
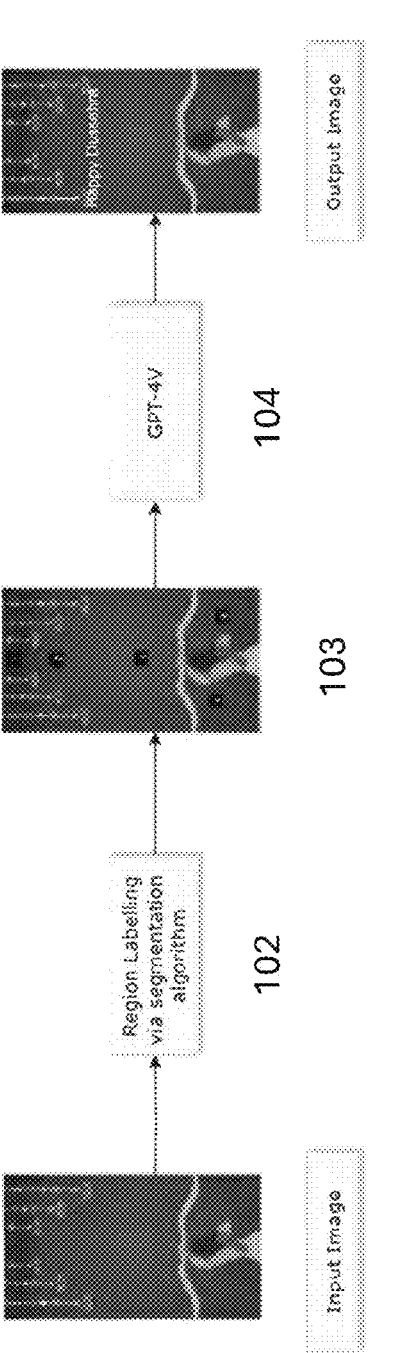
FIG. 1 depicts a method for zero-shot layout generation according to an embodiment of the present disclosure.

GPT-4V can understand the global semantic relationship between the textual and visual elements of a graphic but has not been able to visually link the text with a sub-section in the background image. Therefore, embodiments of the present disclosure focus on vision prompting approaches where an image may be partitioned into semantically meaningful segments to improve spatial understanding of the visual elements for GPT-4V. This visual grounding may allow GPT-4V to better localize the placement of the text content on the background image.

The Set-of-Marks (SOM) method according to embodiments of the present disclosure may be utilized to better localize placement of text content on a background image. SoM is a visual prompting method which partitions an image into regions at different levels of granularity using models and overlays these regions with a set of marks. Images may be processed using the SOM method before being fed to GPT-4V.

Certain embodiments of the present disclosure provide a computer system configured to process images and use GPT-4V comprising one or more hardware computer processors configured to execute code in order to cause the system to divide at least one image into a plurality of regions, place at least one marker on the plurality of regions, pass the divided and marked image(s) to the Generative AI LMM, wherein a prompt is shared, and providing a bounding box to predict placement of primary text on the image, wherein the bounding box is applied to a final image to place primary text on the final image. Embodiments may be implemented on one or more hardware computer processors and one or more storage devices/databases having memory to process and/or store the images.

For example, embodiments may use a zero-shot design segmentation processor which may be a computer vision system capable of segmenting objects in an image without needing any prior training data on the specific objects it is asked to identify, essentially allowing it to segment new, unseen object types based on a text description or prompt alone. The computer vision system may include at least a power source, at least one image acquisition device (such as a camera), at least one processor, and control and communication cables and/or wireless interconnection mechanism. The image acquisition device may produce a digital image by one or several image sensors, which, besides various types of light-sensitive cameras, include range sensors, tomography devices, radar, ultra-sonic cameras, etc. Depending on the type of sensor, the resulting image data is an ordinary 2D image, a 3D volume, or an image sequence. The pixel values typically correspond to light intensity in one or several spectral bands (gray images or color images) but can also be related to various physical measures, such as depth, absorption or reflectance of sonic or electromagnetic waves, or magnetic resonance imaging. It should be appreciated that computer vision systems in some embodiments of the present disclosure may use image-acquisition hardware with active illumination or something other than visible light or both, such as structured-light 3D scanners, thermographic cameras, hyperspectral imagers, radar imaging, lidar scanners, magnetic resonance images, side-scan sonar, synthetic aperture sonar, and the like. Such hardware may capture images that are then processed often using the same computer vision algorithms used to process visible-light images. Where processors are referenced herein, vision processing units may be considered a new class of processors to complement CPUs and graphics processing units (GPUs) in computer vision systems used in embodiments of the present disclosure.

Grid segmentation also may be utilized in embodiments of the present disclosure. Images may be divided into a 3×3 grid. Superpixel segmentation may be utilized as well wherein images may be segmented into 9 segments using various superpixel segmentation algorithms including, but not limited to, watershed and SLIC. These segmentation algorithms may be used to divide images into regions. The regions then may be marked in embodiments of the present disclosure.

The center of each region generated using the methods discussed herein (SoM, grid, SLIC and watershed) may be numerically marked. The reference approach may utilize a few-shot approach where a randomly sampled reference image, an example being perfectly placed text on an image, may be introduced to the model to improve its performance.

Figure 2:
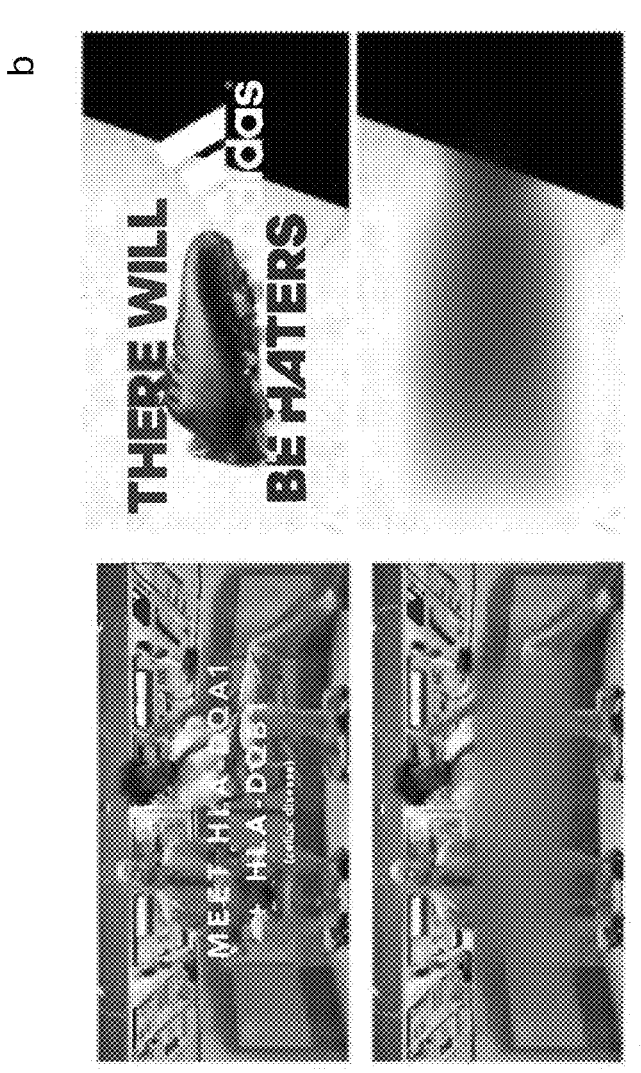
FIG. 2 compares a ground truth image from LayoutDeTr dataset with 1× inpainted images from LayoutDeTr dataset.

To evaluate these approaches, a dataset of 50 images from Canva.com, featuring advertisements, posters, and cards, was compiled. Each image features multiple text elements. The largest text was identified and labeled as the primary element for ground truth. During inference, images stripped of all text were used to assess the performance in text placement of the primary text's content. A decision was made to avoid using the ad banner dataset that LayoutDeTr introduced and is trained on mainly due to the concern that they used diffusion-based image inpainting process to remove the layout elements to prepare the input image for the experiments. Also, the images in the dataset are not stored in file format that would allow manual editing of text elements on a graphic design tool. The inpainting process used to remove the text elements ended up introducing artifacts (blurred section) as depicted in FIG. 2 which may bias the evaluation/comparison. In FIG. 2, a and b depict a ground truth image from LayoutDeTr dataset, and c and d depict 1× inpainted images from LayoutDeTr dataset.

To test out the biases in the LayoutDeTr dataset, zero-shot evaluation was run on base GPT-4V using two segmentation approaches—SLIC and Grid—with the task of detecting primary text on a randomly sampled set of 500 images selected from the LayoutDeTr dataset. For each sampled image in the dataset, the primary text was selected based on whichever box had the highest bounding box area-to-text length ratio. Exceptionally low IoU values were found as reported in Table 2 which compares performance of base GPT-4V to the segmentation approach according to embodiments of the present disclosure on the LayoutDeTr dataset.

TABLE 2

Performance of base GPT-4V and our segmentation approach on LayoutDeTr dataset

| Method | Average IoU | Best of 3 IoU |
|---|---|---|
| GPT-4V | 0.0023 | 0.004 |
| OPT-4V + Grid | 0.0044 | 0.0034 |
| GPT-4V + SLIC | 0.0044 | 0.0066 |

This data highlights the issue that may arise from artifacts in the image as they appear to be visual elements on the images. Laying a textual element on top of it would be essentially blocking the artifact and will be a bad place to put the text. Hence, GPT-4V rightly avoids it.

To ensure fair and accurate evaluation, a high-quality dataset was manually created and a diverse set of graphics including advertisements, greeting posters, and invitation cards were compiled to cover a broad range of graphic layout design scenarios. To avoid inpainting, graphics/templates present on graphic design tools/platforms were used (this overcomes the limitation of the existing open-source dataset faced as textual elements can be edited out in graphics/templates on graphic design platforms like Canva). Canva.com is a widely popular graphic design tool and contains sample/pre-made top rated graphics of previously mentioned categories. Canva.com was used to identify and collect the templates and then perform editing to generate input images (without any editable textual elements) and ground truth images (with only primary/main text element). This was followed by annotation of the ground truth images to get the bounding box coordinates for the primary text. The distribution of the dataset was as follows—40% greeting posters, 24% invitation cards and 36% advertisements, with size totaling to 50.

Ablation studies also were run. GPT-4V may understand the semantic relationship between the elements, but it struggles with finding the appropriate coordinates in the image. To test this hypothesis, the methods according to embodiments of the present disclosure were tested on an alternate version of the ground-truth images in which the text is removed from the graphics that are desired to be detected and keep the rest of the text intact in the image. The results of best and average IoU across 3 runs for visual prompting methods according to embodiments of the present disclosure and LayoutDeTr on the alternate dataset are presented in Table 3.

TABLE 3

Best and average IoU across 3 runs, for proposed visual prompting methods and Layout-Detr on alternate dataset

| Method | Average IoU | Best of 3 IoU |
|---|---|---|
| GPT-4V | 0.063 | 0.092 |
| GPT-4V + SOM | 0.060 | 0.089 |
| GPT-4V + Grid | 0.101 | 0.142 |

7

TABLE 3-continued

Best and average IoU across 3 runs, for proposed visual
prompting methods and Layout-Detr on alternate dataset

| Method | Average IoU | Best of 3 IoU |
|---|---|---|
| GPT-4V + SLIC | 0.119 | 0.172 |
| GPT-4V + Watershed | 0.065 | 0.084 |
| OPT-4V + Reference Image | 0.105 | 0.135 |
| LayoutDetr | 0.161 | 0.161 |

This is an ablation study in comparison to Table 1. As shown in Table 3, there is not much difference in the values, which substantiates the above-referenced hypothesis. More specifically, even if the difficulty of the task is increased compared to the scenario depicted in Table 1, the accuracies remain stable. GPT-4V can identify the correct place for the text, but it struggles with this task as it is not able to identify the appropriate bounding box coordinates without use of methods according to embodiments of the present disclosure.

For all experiments described herein, the images were re-sized to 768×768 to maintain consistency. Various region labelling methods were explored on the images which serve as the input for GPT-4V. GPT-4V may be prompted to provide the bounding box coordinates for the position it deems to be the best for the placement of the text within the image, judging by the positioning of other elements present in the image. GPT-4V also may be prompted to provide the ideal font size of the text and choose an appropriate font color between black and white, to maintain readability when placed on the image background.

The prompt designed to elicit the desired response from GPT-4V is shared herein. Multiple iterations of this prompt were evaluated and providing it the image size and explicitly telling it how to position the text improved its performance. The same prompt was used for every approach except for the reference image experiment in which we add a one-line description about the reference image—You are an expert design consultant with a creative mind. You are provided with an image of dimensions 768*768 which is to be used for an advertisement banner. Your task is to suggest the best place within the image to place the text of the advertisement 'text'. You must keep in mind the following things: 1. Position Selection: The given text is the most important text or the header of an advertisement. Therefore, it has to be positioned strictly in a plain area and must not overlap any other objects present in the image. 2. Font Size Selection: The text must have a font size which is large enough to garner attention, yet at the same time not overlap any of the objects in the image. So, estimate the font size for the header accordingly. 3. Font Color Selection: Identify and select the ideal font color as black or white according to the background. The font should be clearly visible and in contrast with the background. You need to provide the ideal bounding box coordinates for the text box. Calculate the area text would take and then give coordinates, as text should not go out of the image. The width of the box would be x2-x1, so specify the coordinates according to the width it would need. Do remember that You are capable enough and have all the relevant information present. Process through the image and provide the results. DO remember that you have all the information needed for getting the results. Your response must be in the following format: Line1: 'Font Size=p' where p is the font size suggestion. Line2: 'Coordinates=[x1,y1] where x1, y1 are the top left coordinates of the bounding box. Line3: 'Font Color=k' where k=0,0,0 if font color is black and k=256,256,256 if font color is white. Line4: 'Bottom=[p1,q1]' where p1, q1 are the bottom right coordinates of the bounding box. Just print these 4 lines and nothing else. There should be no space after any comma while printing coordinates. Strictly print it in the above format. Take a deep breath. Think step by step and answer.

FIG. 1 depicts a method for zero-shot layout generation according to an embodiment of the present disclosure. For the reference image-based prompting approach, which is one shot, an additional reference image may be passed along with the input image to GPT-4V. In step 101, an input image may be provided. It should be appreciated that there are no specific requirements for the input image; any graphics may be utilized in embodiments of the present disclosure. In step 102, region labeling using a segmentation algorithm may be performed. In step 103, an additional reference image may be provided, and in step 104, GPT-4V may be performed to produce an output image.

GPT-4V may output the bounding box where the primary text needs to be placed post visual reasoning that is aided by the visual prompting strategies. These visual prompting methods may understand the image and put visual markers on the image. The goal is to get GPT-4V to predict the placement of primary text on the graphics. Accordingly, different segmentation strategies may be used to create regions on the images and put markers on the regions. The image may then be passed to GPT-4V, and the prompt may be shared. GPT-4V may provide the bounding box for the text placement. For the final image, the bounding box location may be used to put the primary text on the image.

Each experiment was run 3 times to account for the variability that rises from using a largely non-deterministic model like GPT-4V. For each experiment, the intersection over union (IoU) may be calculated using 2 different approaches, first using the average over the entire dataset and second where the best score per image may be selected across the three trials before averaging and these results are presented in Table 1.

TABLE 1

Best IoU scores across 3 runs & JoU for
visual prompting methods & LayoutDetr

| Method | IoU | Best of 3 IoU |
|---|---|---|
| GPT-4V | 0.068 | 0.088 |
| GPT-4V + SOM | 0.072 | 0.090 |
| GPT-4V + Grid | 0.125 | 0.192 |
| GPT-4V + SLIC | 0.107 | 0.186 |
| GPT-4V + Watershed | 0.113 | 0.151 |
| GPT-4V + Reference Image | 0.110 | 0.137 |
| LayoutDetr | 0.165 | 0.165 |

This approach also was compared with LayoutDeTr which is trained in a supervised way to do graphic layout design. Results show that the approaches according to embodiments of the present disclosure beat base GPT-4V and the set-of-marks prompting method. The grid and SLIC-based approaches according to embodiments of the present disclosure outperform LayoutDeTr (on Best of 3 IoU).

Figure 3:
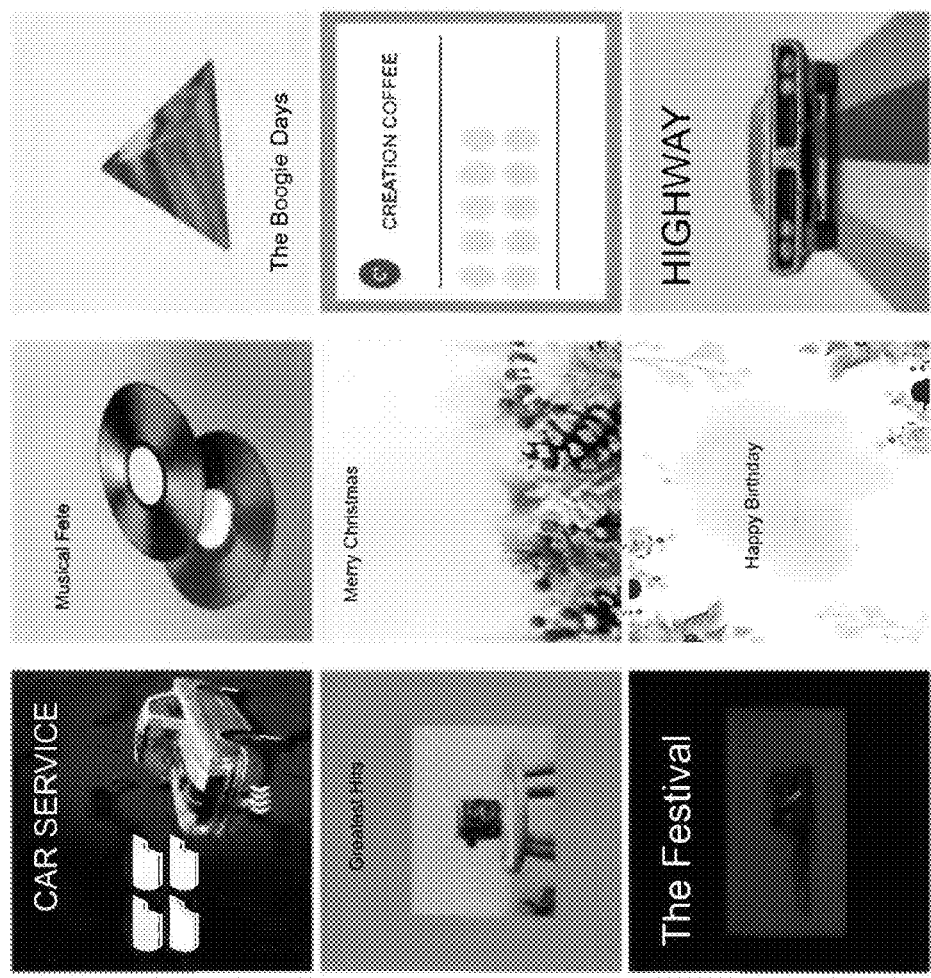
FIG. 3 depicts sample results from GPT-4V with simple linear iterative clustering (SLIC) segmentation approach according to an embodiment of the present disclosure.
Figures 4A, 4B, 4C:
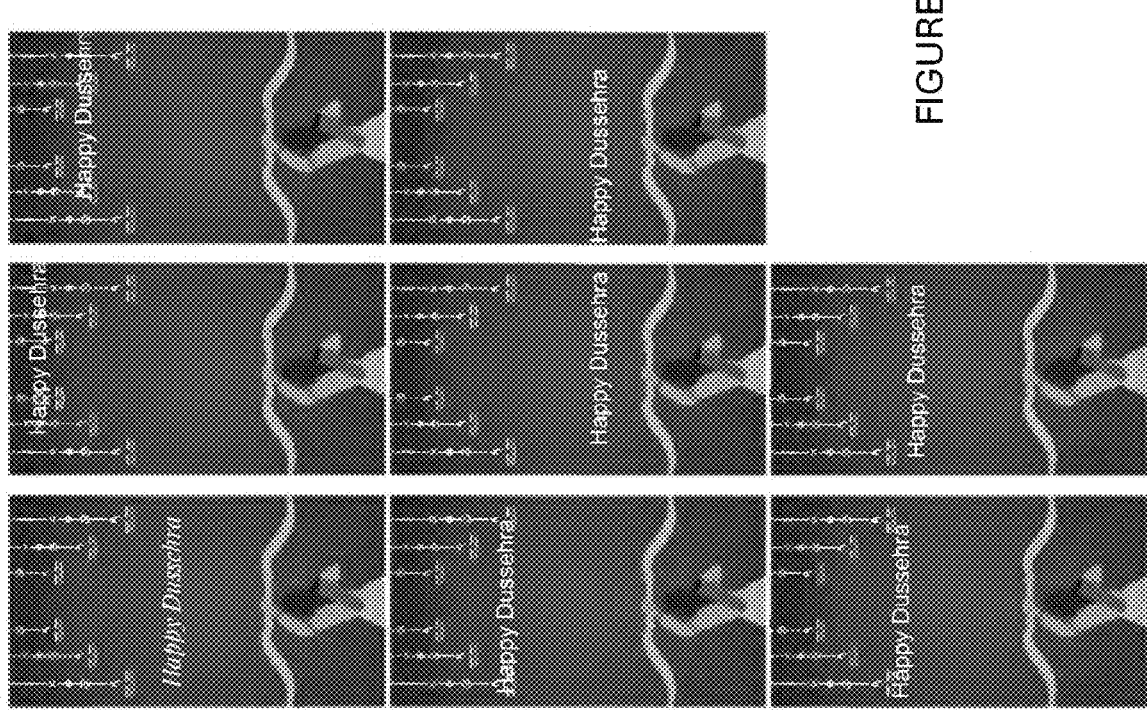
FIG. 4A depicts from left to right a ground truth image, output from GPT-4V, and output from GPT-4V +SOM respectively.
FIG. 4B depicts from left to right an output from GPT-4V +SLIC, output from GPT-4V +watershed, and output from GPT-4V +reference image respectively.
FIG. 4C depicts from left to right an output from LayoutDeTr and output from GPT-4V +Grid respectively.

The capabilities of GPT-4V were tested on zero-shot graphic layout design, and its capabilities were augmented with various visual prompting approaches. Empirical findings substantiate that providing supplementary visual cues to GPT-4V enhances the model's performance relative to its baseline configuration. Approaches according to embodiments of the present disclosure were compared with other supervised detection methods and show that the grid-based and SLIC-based visual prompting method match and in some iterations even surpass LayoutDeTr. FIG. 3 depicts sample results from GPT-4V with SLIC segmentation approach according to an embodiment of the present disclosure. FIG. 4A depicts from left to right a ground truth image, output from GPT-4V, and output from GPT-4V +SOM respectively. FIG. 4B depicts from left to right an output from GPT-4V +SLIC, output from GPT-4V +watershed, and output from GPT-4V +reference image respectively. FIG. 4C depicts from left to right an output from LayoutDeTr and output from GPT-4V +Grid respectively.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for zero-shot graphic layout design generation using a Generative AI large multimodal model (LMM), the method comprising:

using one or more segmentation strategies, dividing at least one image into a plurality of semantically or spatially distinct regions;

using the one or more segmentation strategies, placing at least one visual marker on the plurality of semantically or spatially distinct regions that explicitly denote the plurality of semantically or spatially distinct regions;

passing the at least one image that has been divided and visually marked and a prompt to the Generative AI LMM; and using pretrained, vision-language understanding in the Generative AI LMM, predicting coordinates by referring to the at least one visual marker, associating the at least one visual marker with corresponding ones of the plurality of semantically or spatially distinct regions providing a bounding box to predict placement of primary text on the image, wherein the bounding box is applied to a final image to place primary text on the final image.

2. The method of claim 1, wherein the Generative AI LMM is Generative Pre-trained Transformer 4 Vision (GPT-4V).

3. The method of claim 1, wherein the one or more segmentation strategies are selected from dividing into grids, simple linear iterative clustering (SLIC), and watershed.

4. The method of claim 1, wherein the at least one image includes at least one visual element.

5. The method of claim 1, wherein bounding box coordinates for a position identified as best for placement of text within the at least one image are obtained based on positioning of other elements present in the at least one image and the prompt.

6. The method of claim 5, wherein a font size of the text and a font color to maintain readability when placed on a background of the at least one image is decided based on the prompt and the other elements present in the at least one image.

7. The method of claim 1, wherein the prompt includes at least the following:

identification of dimensions of the at least one image;

identification of a purpose associated with the at least one image;

a directive to suggest where within the at least one image to place the primary text;

a directive as to position selection;

a directive as to font size selection; and a directive as to font color selection.

8. The method of claim 7, wherein the prompt further comprises:

an area that the primary text is to occupy; and coordinates for a bounding box for the primary text, wherein the primary text does not go outside of the at least one image and the coordinates are specified according to a width needed for placement.

9. The method of claim 7, wherein the directive as to position selection identifies that the primary text is to be positioned in an area not overlapping other objects present in the at least one image.

10. The method of claim 7, wherein the directive as to font size selection identifies that the primary text has at least a font size that does not overlap any objects in the at least one image.

11. The method of claim 7, wherein the directive as to font color selection identifies that the font color is black or white contrasting with a background of the at least one image.

12. The method of claim 1 further comprising:

outputting the bounding box in a format comprising:

Line1: 'Font Size=p' where p is the font size suggestion;

Line2: 'Coordinates=[x1,y1] where x1, y1 are top left coordinates of the bounding box;

Line3: 'Font Color=k' where k=0,0,0 if font color is black and k=256,256,256 if font color is white;

Line4: 'Bottom=[p1,q1]' where p1, q1 are bottom right coordinates of the bounding box.

13. A method for zero-shot graphic layout design generation using a Generative AI large multimodal model (LMM), the method comprising:

using one or more segmentation strategies, dividing at least one image into a plurality of semantically or spatially distinct regions, the at least one image including a plurality of text elements;

using the one or more segmentation strategies, placing at least one visual marker on the plurality of semantically or spatially distinct regions that explicitly denote the plurality of semantically or spatially distinct regions;

passing the at least one image that has been divided and visually marked and a prompt to use pretrained, vision-language understanding in the Generative AI LMM to obtain bounding box coordinates for a position identified as best for placement of text within the at least one image based on positioning of other elements present in the at least one image and the prompt; and using pretrained, vision-language understanding in the Generative AI LMM, predicting coordinates by referring to the at least one visual marker, associating the at least one visual marker with corresponding ones of the plurality of semantically or spatially distinct regions providing a bounding box to predict placement of primary text on the image, wherein the bounding box is applied to a final image to place primary text on the final image.

14. The method of claim 13, wherein a font size of the text and a font color to maintain readability when placed on a background of the at least one image is decided based on the prompt and the other elements present in the at least one image.

15. The method of claim 13, wherein the prompt includes at least the following:

identification of dimensions of the at least one image;

identification of a purpose associated with the at least one image;

a directive to suggest where within the at least one image to place the primary text;

a directive as to position selection;

a directive as to font size selection; and a directive as to font color selection.

16. The method of claim 15, wherein the prompt further comprises:

an area that the primary text is to occupy; and coordinates for a bounding box for the primary text, wherein the primary text does not go outside of the at least one image and the coordinates are specified according to a width needed for placement.

17. The method of claim 15, wherein the directive as to position selection identifies that the primary text is to be positioned in an area not overlapping other objects present in the at least one image.

18. The method of claim 15, wherein the directive as to font size selection identifies that the primary text has at least a font size that does not overlap any objects in the at least one image.

19. The method of claim 15, wherein the directive as to font color selection identifies that the font color is black or white contrasting with a background of the at least one image.

20. The method of claim 13 further comprising:

outputting the bounding box in a format comprising: Line1: 'Font Size=p' where p is the font size suggestion; Line2: 'Coordinates=[x1,y1] where x1, y1 are top left coordinates of the bounding box; Line3: 'Font Color=k' where k=0,0,0 if font color is black and k=256,256,256 if font color is white; Line4: 'Bottom= [p1,q1]' where p1, q1 are bottom right coordinates of the bounding box.

* * * * *